US012647366B2

(12) United States Patent
Israeli et al.

(10) Patent No.: US 12,647,366 B2
(45) Date of Patent: Jun. 2, 2026

(54) SYSTEMS AND METHODS FOR COMMUNICATION NETWORK LOAD BALANCING

(71) Applicant: Cisco Technology, Inc., San Jose, CA (US)

(72) Inventors: Etgar Israeli, Modiin-macabim-reut (IL); Elad Naor, Kibbutz Alonim (IL); Guy Caspary, Caesarea (IL); Mel Tsai, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 18/401,005

(22) Filed: Dec. 29, 2023

(65) Prior Publication Data

US 2025/0219945 A1 Jul. 3, 2025

(51) Int. Cl.
*H04L 47/12* (2022.01)
*H04L 1/00* (2006.01)
*H04L 47/125* (2022.01)

(52) U.S. Cl.
CPC .......... *H04L 47/125* (2013.01); *H04L 1/0061* (2013.01)

(58) Field of Classification Search
CPC ..... H04L 47/125; H04L 1/0061; H04L 45/24; H04L 67/1023
See application file for complete search history.

(56) References Cited

U.S. PATENT DOCUMENTS

| | | | |
|---|---|---|---|
| 11,418,214 B1 * | 8/2022 | Caspary | ................ H04L 1/0061 |
| 2011/0013627 A1 | 1/2011 | Matthews et al. | |
| 2011/0106866 A1 | 5/2011 | Grayson et al. | |

| | | | |
|---|---|---|---|
| 2011/0231636 A1 | 9/2011 | Olson et al. | |
| 2019/0109715 A1 | 4/2019 | Hars | |
| 2019/0179618 A1 | 6/2019 | Noor et al. | |
| 2020/0403802 A1 | 12/2020 | Hars | |
| 2021/0373784 A1 * | 12/2021 | Atsumi | ................. G06F 3/0679 |
| 2022/0399901 A1 | 12/2022 | Caspary et al. | |

(Continued)

FOREIGN PATENT DOCUMENTS

CN        115348018 A        11/2022

OTHER PUBLICATIONS

European Search Report for European Application No. 24219900.8, dated May 13, 2025, 9 Pages.

*Primary Examiner* — Schquita D Goodwin

(74) *Attorney, Agent, or Firm* — Rutan & Tucker, LLP; Ravi Mohan; Marc A. McClain

(57) ABSTRACT

Devices, networks, systems, methods, and processes for load balancing are described herein. A device can receive a stream of data packets. The device may generate a load balancing vector based on the stream of data packets. The device can encode the load balancing vector and can further apply substitution operation on encoded load balancing vector to generate a modified load balancing vector. The device may apply a hash function on the modified load balancing vector to generate a load balancing key. The device can determine a destination device based on the load balancing key. The device may forward the stream of data packets to the destination device. A load balancing method of the present disclosure can distribute data traffic evenly or uniformly, without traffic polarization. A load balancing system of the present disclosure can generate the load balancing key in time efficient and resource efficient manner.

20 Claims, 10 Drawing Sheets

(56) References Cited

U.S. PATENT DOCUMENTS

| | | | |
|---|---|---|---|
| 2023/0068386 A1* | 3/2023 | Akdeniz | ............... G06N 3/084 |
| 2023/0259638 A1* | 8/2023 | Yang | ...................... G06F 21/72 |
| | | | 726/26 |
| 2024/0333649 A1* | 10/2024 | Nag | ..................... H04L 47/115 |

* cited by examiner

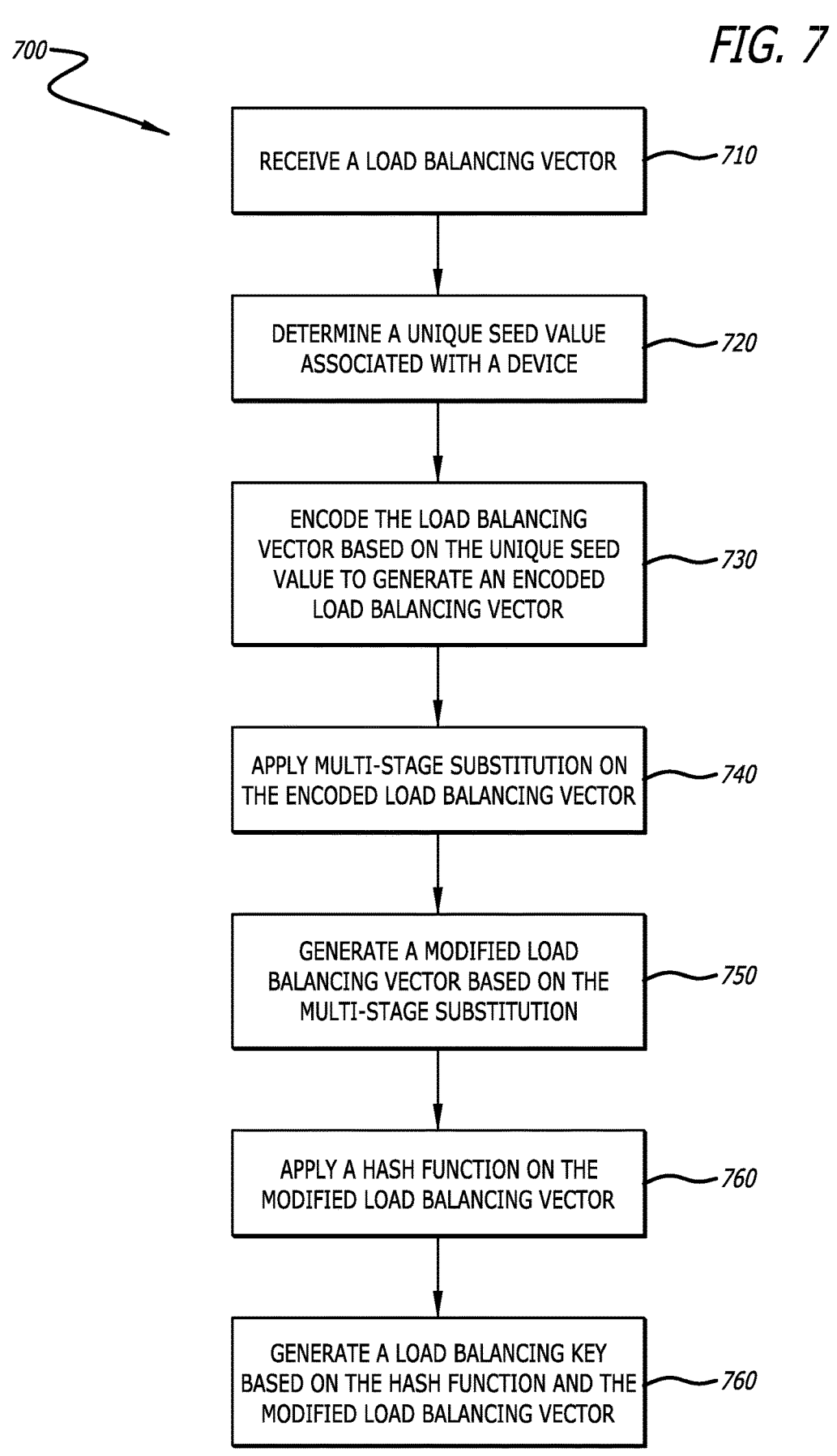

RECEIVE A LOAD BALANCING VECTOR — *710*

DETERMINE A UNIQUE SEED VALUE ASSOCIATED WITH A DEVICE — *720*

ENCODE THE LOAD BALANCING VECTOR BASED ON THE UNIQUE SEED VALUE TO GENERATE AN ENCODED LOAD BALANCING VECTOR — *730*

APPLY MULTI-STAGE SUBSTITUTION ON THE ENCODED LOAD BALANCING VECTOR — *740*

GENERATE A MODIFIED LOAD BALANCING VECTOR BASED ON THE MULTI-STAGE SUBSTITUTION — *750*

APPLY A HASH FUNCTION ON THE MODIFIED LOAD BALANCING VECTOR — *760*

GENERATE A LOAD BALANCING KEY BASED ON THE HASH FUNCTION AND THE MODIFIED LOAD BALANCING VECTOR — *760*

*FIG. 8*

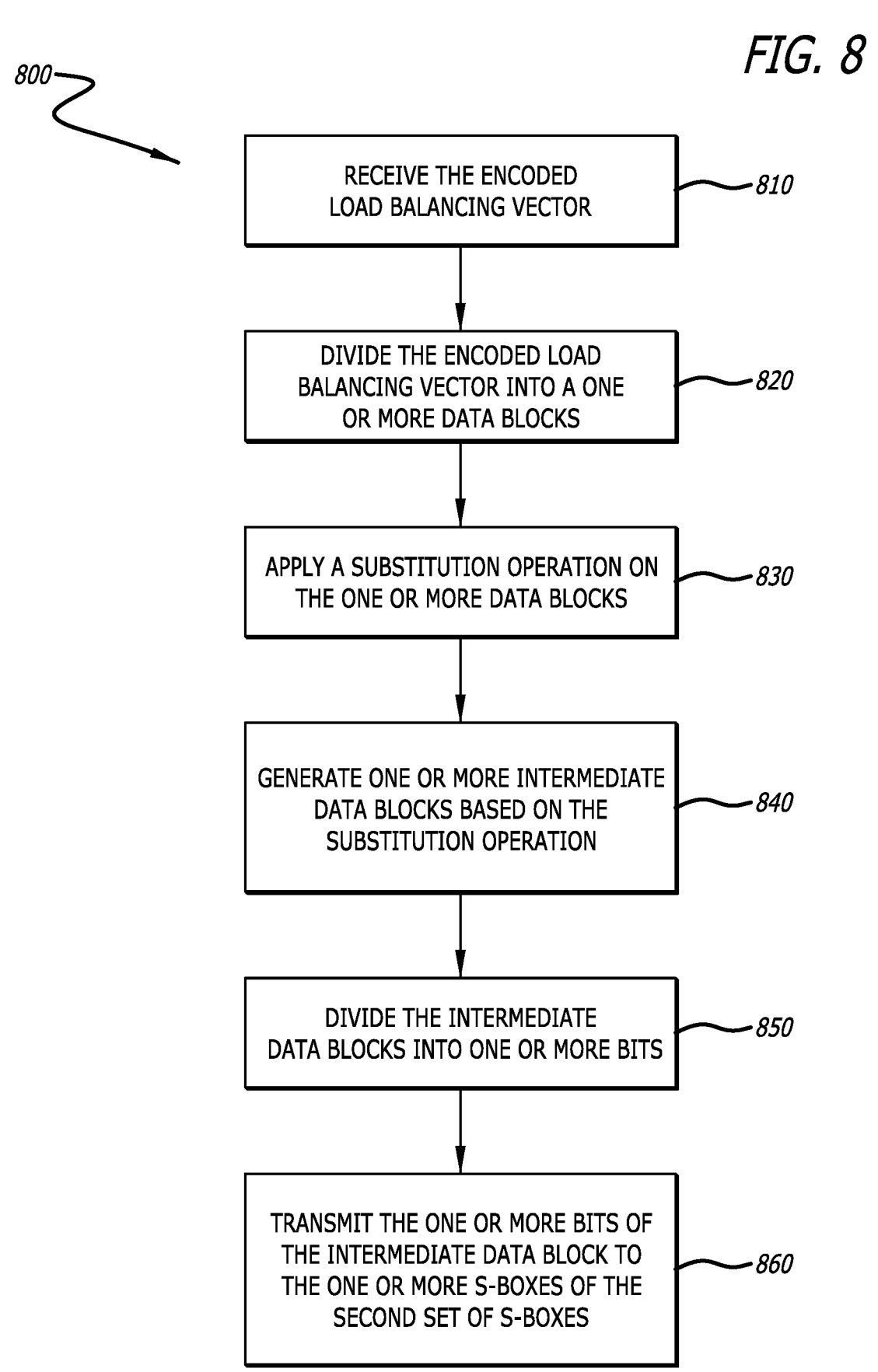

*800*

RECEIVE THE ENCODED
LOAD BALANCING VECTOR — *810*

DIVIDE THE ENCODED LOAD
BALANCING VECTOR INTO A ONE
OR MORE DATA BLOCKS — *820*

APPLY A SUBSTITUTION OPERATION ON
THE ONE OR MORE DATA BLOCKS — *830*

GENERATE ONE OR MORE INTERMEDIATE
DATA BLOCKS BASED ON THE
SUBSTITUTION OPERATION — *840*

DIVIDE THE INTERMEDIATE
DATA BLOCKS INTO ONE OR MORE BITS — *850*

TRANSMIT THE ONE OR MORE BITS OF
THE INTERMEDIATE DATA BLOCK TO
THE ONE OR MORE S-BOXES OF THE
SECOND SET OF S-BOXES — *860*

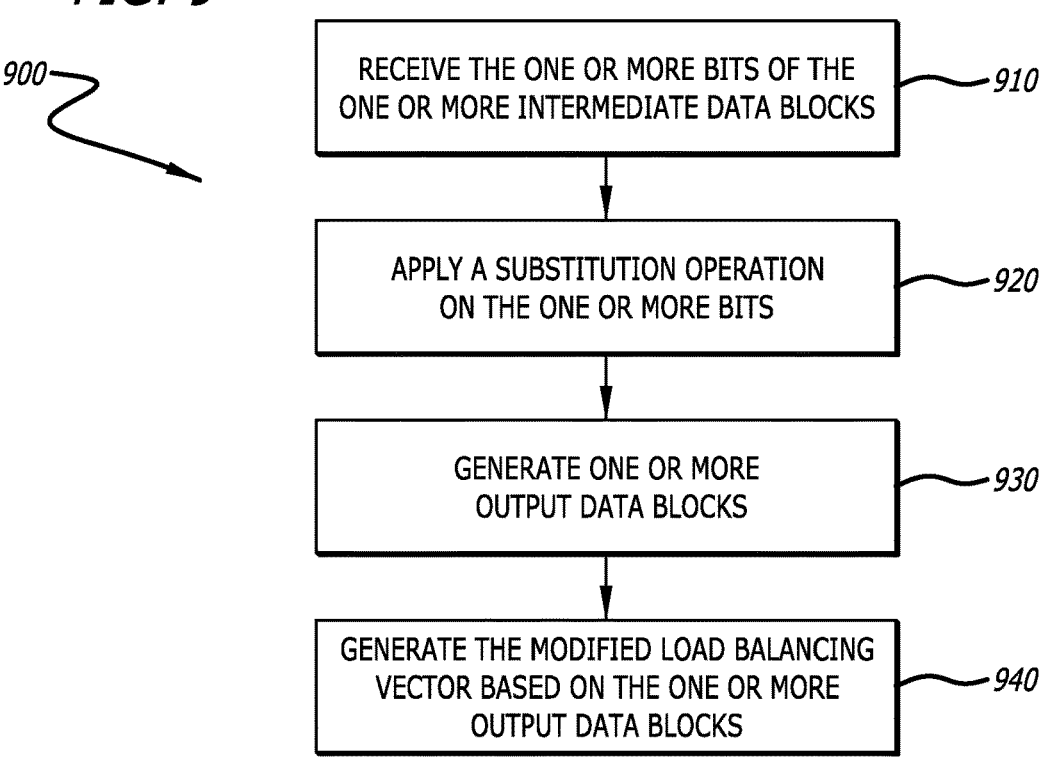

| RECEIVE THE ONE OR MORE BITS OF THE ONE OR MORE INTERMEDIATE DATA BLOCKS | — 910 |

| APPLY A SUBSTITUTION OPERATION ON THE ONE OR MORE BITS | — 920 |

| GENERATE ONE OR MORE OUTPUT DATA BLOCKS | — 930 |

| GENERATE THE MODIFIED LOAD BALANCING VECTOR BASED ON THE ONE OR MORE OUTPUT DATA BLOCKS | — 940 |

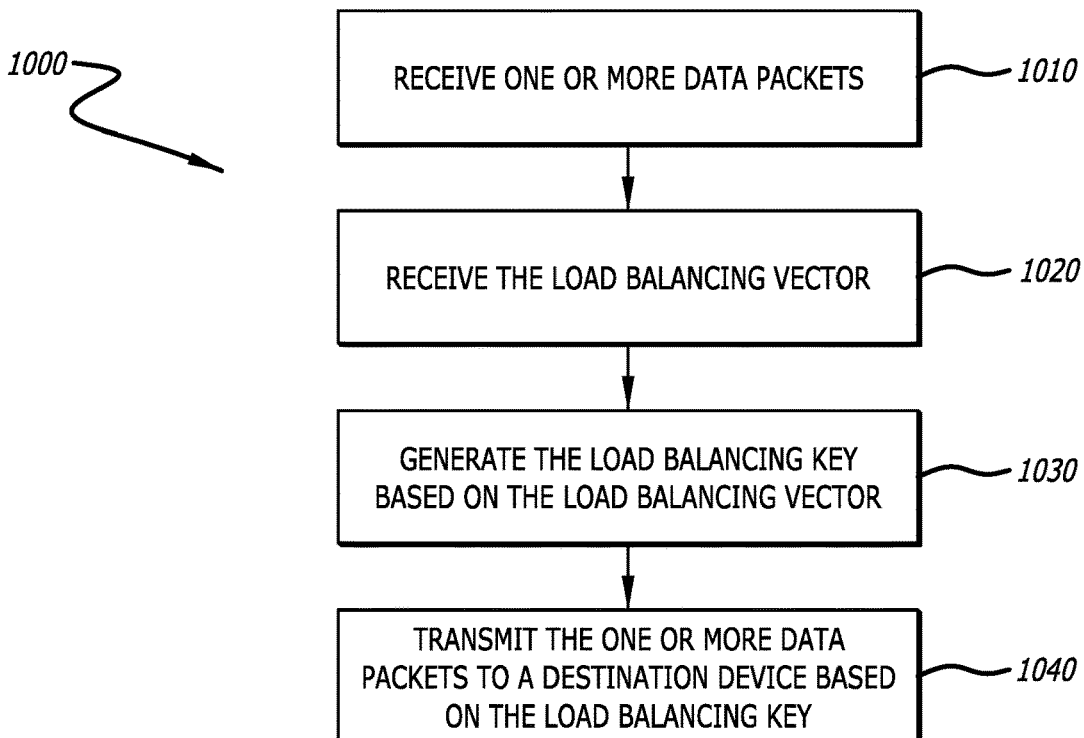

| RECEIVE ONE OR MORE DATA PACKETS | — 1010 |

| RECEIVE THE LOAD BALANCING VECTOR | — 1020 |

| GENERATE THE LOAD BALANCING KEY BASED ON THE LOAD BALANCING VECTOR | — 1030 |

| TRANSMIT THE ONE OR MORE DATA PACKETS TO A DESTINATION DEVICE BASED ON THE LOAD BALANCING KEY | — 1040 |

SYSTEMS AND METHODS FOR COMMUNICATION NETWORK LOAD BALANCING

The present disclosure relates to communication networks. More particularly, the present disclosure relates to load balancing in a communication network.

BACKGROUND

In modern communication networks, load balancing is necessary to distribute data traffic across multiple links in a communication network to efficiently manage resources, ensure high availability, and develop fault tolerance. Conventional load balancing systems often utilize Cyclic Redundancy Check (CRC) hashing to distribute the data traffic across the communication network by generating load balancing keys from packet headers of data packets in the data traffic. However, the conventional load balancing systems fail to uniformly distribute the data traffic, despite changes in methods or seeds, thereby causing polarization of the data traffic. Such polarization often arises from use of consecutive fields or similar load balancing vectors that are hashed across different devices. On the other hand, modifications to fields in the load balancing vectors imposes heavy demand on hardware and increases complexities.

Further complications arise when the hash functions are not robust. For example, with linear exclusive-OR based hash functions such as CRC, alterations to the load balancing vectors lead to similar hash outputs, especially when multiple fields in the load balancing vectors are utilized simultaneously for hashing. Such similar hash outputs further increase polarization in the distribution of the data traffic. One of the main challenges is to maintain a balance between the distribution, complexity, resilience, and ease of implementation of load balancing. Some conventional 'color recombining' and coprime-based load balancing systems often require specific network topologies or require duplication of load balancing devices. These conventional load balancing systems fail to meet demands of expanding and complex communication networks.

SUMMARY OF THE DISCLOSURE

Systems and methods for load balancing in a communication network in accordance with embodiments of the disclosure are described herein. In some embodiments, a device includes a processor, a memory communicatively coupled to the processor, and a load balancing logic. The logic is configured to receive a load balancing vector, determine a unique seed value associated with the device, encode the load balancing vector based on the unique seed value to generate an encoded load balancing vector, apply multi-stage substitution on the encoded load balancing vector, and generate a modified load balancing vector based on the multi-stage substitution.

In some embodiments, the encoded load balancing vector is generated by applying an exclusive-OR operation on the load balancing vector and the unique seed value.

In some embodiments, the unique seed value is determined based on one or more identifiers of the device.

In some embodiments, the load balancing logic is further configured to apply a hash function on the modified load balancing vector, and generate a load balancing key based on the hash function and the modified load balancing vector.

In some embodiments, the hash function is a Cyclic Redundancy Check (CRC) hash.

In some embodiments, a first substitution stage of the multi-stage substitution is performed by a first set of Substitution-Boxes (S-Boxes), and a second substitution stage of the multi-stage substitution is performed by a second set of S-Boxes.

In some embodiments, each S-Box of the first set of S-Boxes is coupled with one or more S-Boxes of the second set of S-Boxes.

In some embodiments, the first substitution stage is configured to receive the load balancing vector, divide the load balancing vector into a one or more data blocks, apply a substitution operation on the one or more data blocks, and generate one or more intermediate data blocks based on the substitution operation.

In some embodiments, each S-Box of the first set of S-Boxes includes a first combinational circuit configured to receive a data block of the one or more data blocks, generate an intermediate data block of the one or more intermediate data blocks based on the data block, divide the intermediate data block into one or more bits, and transmit the one or more bits of the intermediate data block to the one or more S-Boxes of the second set of S-Boxes.

In some embodiments, each S-Box of the second set of S-Boxes includes a second combinational circuit configured to receive the one or more bits of the one or more intermediate data blocks, apply a substitution operation on the one or more bits of the one or more intermediate data blocks, and generate one or more output data blocks.

In some embodiments, the second substitution stage is configured to generate the modified load balancing vector based on the one or more output data blocks.

In some embodiments, the load balancing key is of lesser size than the load balancing vector.

In some embodiments, the load balancing key is indicative of a destination device.

In some embodiments, the load balancing logic is further configured to receive one or more data packets and transmit the one or more data packets to the destination device based on the load balancing key.

In some embodiments, a device includes a processor, a memory communicatively coupled to the processor, and a load balancing logic. The logic is configured to receive a load balancing vector, determine a unique seed value associated with the device, encode the load balancing vector based on the unique seed value to generate an encoded load balancing vector, apply multi-stage substitution on the encoded load balancing vector, generate a modified load balancing vector based on the multi-stage substitution, apply a hash function on the modified load balancing vector, and generate a load balancing key based on the hash function and the modified load balancing vector.

In some embodiments, a first substitution stage of the multi-stage substitution is configured to receive the load balancing vector, divide the load balancing vector into a one or more data blocks, apply a substitution operation on the one or more data blocks, and generate one or more intermediate data blocks based on the substitution operation.

In some embodiments, a second substitution stage of the multi-stage substitution is configured to receive the one or more intermediate data blocks, generate one or more output data blocks based on the one or more intermediate data blocks, and generate the modified load balancing vector based on the one or more output data blocks.

In some embodiments, a method includes receiving a load balancing vector, determining a unique seed value, encoding the load balancing vector based on the unique seed value for generating an encoded load balancing vector, applying multi-stage substitution on the encoded load balancing vector, generating a modified load balancing vector based on the multi-stage substitution, applying a hash function on the modified load balancing vector, and generating a load balancing key based on the hash function and the modified load balancing vector.

In some embodiments, a method includes applying an exclusive-OR operation on the load balancing vector and the unique seed value for generating the encoded load balancing vector.

In some embodiments, a method includes configuring one or more sets of Substitution-Boxes (S-Boxes) for applying the multi-stage substitution on the encoded load balancing vector.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 7 is a flowchart depicting a process for generating a load balancing key, in accordance with various embodiments of the disclosure;

FIG. 8 is a flowchart depicting a process performed by a first substitution stage, in accordance with various embodiments of the disclosure;

FIG. 9 is a flowchart depicting a process performed by a second substitution stage, in accordance with various embodiments of the disclosure;

FIG. 10 is a flowchart depicting a process for load balancing, in accordance with various embodiments of the disclosure.

Figure 1:
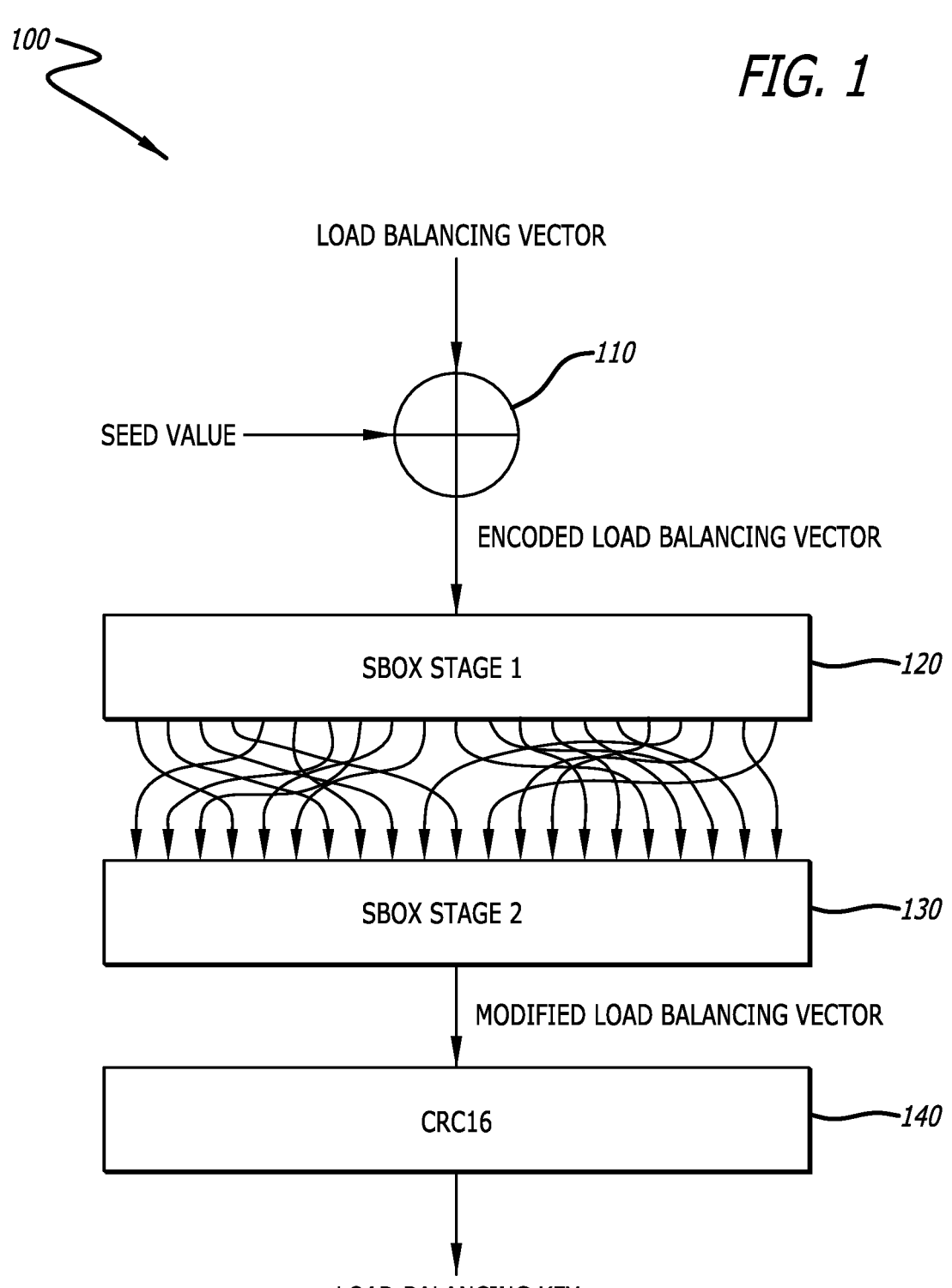
FIG. 1 is a conceptual illustration of a load balancing system, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

Ideally, an effective load balancing system should enhance load balancing performance, should be adaptable to changes in the network topologies, and should require minimal management without causing polarization of the data traffic. However, most load balancing systems struggle to balance between low latency, efficiency, and smaller hardware requirements. Therefore, there is a need to develop a load balancing technique that can minimize polarization with low hardware requirements.

In response to the issues described above, devices and methods are discussed herein that balance distribution of data traffic in a communication network. In numerous embodiments, a load balancing technique of the present disclosure can utilize a combination of a substitution operation and a hash function. In that, the substitution operation may be utilized to modify a load balancing vector, and the hash function may be applied on a modified load balancing vector to generate a load balancing key. The load balancing key can be utilized to forward, transmit, or route a data stream comprising a stream of data packets to one or more destination devices or links in the communication network.

Typically, load balancing involves various methods to generate load balancing keys from packet headers to evenly distribute the data traffic across multiple links or devices. In most load balancing techniques, a Cyclic Redundancy Check (CRC) hash is widely utilized for generating the load balancing keys. In that, the CRC can be applied with an exclusive-OR-based function directly to the load balancing vector, often combined with a configurable CRC seed. While this is computationally efficient, CRC hashing often struggles with ensuring uniform distribution, especially with consecutive fields or identical load balancing vectors hashed across multiple devices. A persistent problem with CRC hashing is traffic polarization which results in uneven traffic distribution, even when different CRC seeds are utilized. That is, random CRC seeds do not significantly improve effectiveness of CRC in terms of avoiding traffic polarization, especially in Equal-Cost Multi-Path (ECMP) routing groups with even number of ports or devices. Typically, for example, utilizing two random seeds do not create two independent hash functions from one CRC polynomial due to linear operation of applying a random CRC seed. In most cases, in spineless Data Center Network (DCN) topologies, random CRC seeds do not solve hash correlation problem.

In one attempt to solve the hash correlation problem, software-based solutions are utilized to manipulate the load balancing vector. In that, certain fields from the load balancing vector are altered and utilized for each device. However, this increases computational complexity, and therefore, is difficult and expensive to implement practically. In another attempt, universal hashing is utilized with a set of predefined uncorrelated hash functions, of which one hash function is randomly chosen for each new sets of keys. However, generation of the uncorrelated hash functions is typically not supported by Application Specific Integrated Circuit (ASICs), thereby making it impossible to be implemented practically in many existing devices. In yet another attempt to solve the hash correlation problem, techniques such as 'color recombining' and coprime-based techniques are utilized. However, 'color recombining' techniques are topology-specific and coprime-based techniques necessitate duplicating load balancing groups to match a coprime value. Both, 'color recombining' and coprime-based techniques cannot generate enough uncorrelated hash functions to avoid the traffic polarization.

In more attempts, hardware-based solutions such as murmur hash, shuffle-CRC, and CRC-RC5 (Rivest Cipher) are utilized. In murmur hash, substantial combinational logic makes practical application very resource intensive and causes latency. In shuffle-CRC, permutations of shuffling input data are limited, and do not provide enough variations to avoid similar outputs of CRC function. On the other hand, large number of permutations require larger combinational logic, thereby adding complexity and increasing hardware size. In CRC-RC5, simultaneous increases in two or more fields in the load balancing vector increases complexity and latency of the hashing. Further, CRC-RC5 faces additional drawbacks. When CRC is performed before RC5, the load balancing vector may suffer the drawbacks associated with CRC, for example, when two load balancing vectors generate same output by CRC, applying RC5 may not generate unique output for the two load balancing vectors. Similarly, any other hash functions applied to the same CRC output may also not generate unique output for the two load balancing vectors. Moreover, CRC-RC5 increases hardware cost due to cell count, and thereby also increases latency.

Therefore, both: software-based and hardware-based solutions fail to address the problem of traffic polarization without increasing complexity and the hardware size. Moreover, these solutions are resource-intensive and hence, difficult to implement practically. The load balancing method and system of the present disclosure avoids the traffic polarization without increasing the complexities or the hardware size.

In many embodiments of the present disclosure, the load balancing method of the present disclosure can be performed by any device in the communication network. A device can receive a load balancing vector. The load balancing vector may be associated with data traffic. The data traffic can include a plurality of data packets. The load balancing vector may include multiple fields that may be utilized to transmit, forward, or route the data traffic in the communication network. The routing of the data traffic is essential to evenly distribute the data traffic across the devices and links in the communication network, thereby performing load balancing. In some embodiments, for example, the load balancing vector may include fields such as, but not limited to, source and destination addresses, protocol information, session or connection information, packet size, server health information, server load information, Quality of Service (QoS) information, or other such metadata. The device can determine a unique seed value associated with the device. The unique seed value may be different for different devices. In certain embodiments, the unique seed value can be determined based on one or more identifiers of the device. In more embodiments, for example, the unique seed value can be a device identifier, a switch identifier, or a node identifier. The unique seed values may be utilized for applying a hash function for load balancing. Therefore, utilizing different seed values in different devices may generate different hash outputs for the different devices, thereby facilitating in reducing polarization of the data traffic. The device can encode the load balancing vector based on the unique seed value to generate an encoded load balancing vector. For encoding, the device may utilize an exclusive-OR (XOR) operation. In some more embodiments, for example, the device can comprise an XOR gate, i.e., an XOR circuit that can receive the unique seed value as a first input and the load balancing vector as a second input, and generate the encoded load balancing vector as an output. In numerous embodiments, the device can utilize other encoding, encryption, or cipher techniques such as, but not limited to, Blowfish or Advanced Encryption Standard (AES), or other such cipher techniques to generate the encoded load balancing vector. The device may apply a multi-stage substitution on the encoded load balancing vector. In some embodiments, the device may apply one or more bit-permutation techniques on the load balancing vector and/or the encoded load balancing vector. In that, in certain embodiments, for example, the device can apply a static bit-permutation on the load balancing vector to generate a permuted load balancing vector. Here, the permuted load balancing vector may be encoded by the XOR circuit. In more embodiments, for example, the device can apply the static bit-permutation on the encoded load balancing vector to generate the permuted load balancing vector. Here, the permuted load balancing vector may be provided as an input to the multi-stage substitution. In many further embodiments, for example, the multi-stage substitution may include two substitution stages. However, the device can utilize more than two substitution stages to achieve higher load balancing efficiencies. In still more embodiments, for example, the device may utilize a predetermined number of substitution stages. In many additional embodiments, for example, the device can determine a number of substitution stages required for achieving load balancing based on requirements of the communication network or requirements of one or more applications running on the device. In still further embodiments, the device may utilize a single substitution stage.

In a number of embodiments, each substitution stage of the multi-stage substitution may comprise multiple Substitution-Boxes (S-Boxes). In some embodiments, for example, a number of S-Boxes in each stage may be equal or may differ for different stages. Each S-Box in each substitution stage can include one or more combinational circuits. In certain embodiments, for example, the S-Boxes can be implemented by ASICs or Field Programmable Gate Arrays (FPGAs). In more embodiments, for example, the S-Boxes may be implemented by integrating into a System-on-Chip (SoC) of the device. Each S-Box may implement one or more substitution operations. In numerous embodiments, for example, each S-Box can implement a different substitution operation. Examples of the substitution operations include, but are not limited to, non-linear transformations, arithmetic operations, look-up tables, key-dependent substitutions, or custom S-Box designs. In some more embodiments, the device can include a first substitution stage coupled with a second substitution stage. The first substitution stage may include a first set of S-Boxes and the second substitution stage may include a second set of S-Boxes. Each S-Box of the first set of S-Boxes can be coupled with one or more S-Boxes of the second set of S-Boxes. In that, in numerous embodiments, for example, each output bit of an S-Box in the first substitution stage may be connected as an input to a distinct S-Box in the second substitution stage. That is, the bits of the intermediate data blocks undergo permutations before being provided as the input to the second substitution stage. In many further embodiments, for example, the S-Boxes can be implemented to introduce non-linearity in the method of load balancing. The non-linearity may increase with an increase in the number of substitution stages. The non-linearity may facilitate in achieving substantially different outputs for even a single bit change in an input, thereby providing a wide range of distinct values for the hash function.

In various embodiments, the first set of S-Boxes may receive the load balancing vector. In numerous embodiments, the first set of S-Boxes can receive the permuted load balancing vector. The first substitution stage can divide the load balancing vector into one or more data blocks. In some embodiments, for example, the first substitution stage may divide the load balancing vector into a group of a predetermined number of bits, for example, a group of four bits, that can form a data block. Each data block, or each group of bits, can be provided as an input to one of the S-Boxes in the first substitution stage. In certain embodiments, for example, each S-Box may be an m×n S-Box or a n×n S-Box. In more embodiments, for example, each S-Box can receive group of four bits of the load balancing vector and generate an intermediate data block of four bits. That is, the first set of S-Boxes can receive the load balancing vector and generate a set of intermediate data blocks that can be provided as input to the second set of S-Boxes. The second set of S-Boxes can receive the set of intermediate data blocks and can apply substitution operation on the set of intermediate data blocks to generate a set of output data blocks. The set of output data blocks generated by the second set of S-Boxes may be utilized to generate a modified load balancing vector. In some more embodiments, for example, the first set of S-Boxes and the second set of S-Boxes may be structurally or functionally similar. In numerous embodiments, the first set of S-Boxes and the second set of S-Boxes may be entirely distinct in structure and function. In many further embodiments, different devices can utilize different substitution boxes. In still more embodiments, the coupling between the S-Boxes of the first substitution stage and the S-Boxes of the second substitution stage may be different for different devices.

In additional embodiments, the device may apply the hash function on the modified load balancing vector to generate a load balancing key. In some embodiments, for example, the hash function can be a CRC hash. In more embodiments, for example, the hash function can be RC5 hash or murmur hash, or any other hash function, for example. The load balancing key may be of lesser size than the load balancing vector. The load balancing key can be indicative of a destination device. The device may receive the data traffic and may forward, transmit, or route the data traffic to the destination device indicated by the load balancing key.

Advantageously, the load balancing system and method of the present disclosure requires a limited number of substitution stages, usually two substitution stages, to provide even traffic distribution. That is, balanced traffic distribution can be achieved by utilizing only two stages, thereby reducing the hardware size and complexity. The load balancing system can handle consecutive field inputs and increment-together scenarios without affecting efficiency. The load balancing system also solves the problem of poor distribution by facilitating modifications to a constant field, thereby impacting the traffic distribution. The S-Boxes are easier to practically implement in an Integrated Circuit (IC) and cause minimal latency. In most practical applications, for example, entire operation including bit-permutation operation, encoding operation, and substitution operation is performed in one clock cycle, thereby minimizing latency. The load balancing system and method of the present disclosure is not topology-specific and also does not require changes to existing topology of the communication network, and hence, is compatible with the communication networks having a variety of different topologies. The load balancing system and method of the present disclosure also does not require duplication of load balancing groups, thereby reducing redundancy in the communication network. Further, the load balancing technique of the present disclosure increases efficiency, throughput, and resource utilization of the communication network and the devices therein. Further, the load balancing technique of the present invention closely adheres to theoretical values of multinomial distribution, thereby ensuring robustness and reliability across varied networking scenarios.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a load balancing system 100, in accordance with various embodiments of the disclosure is shown. The load balancing system 100 may comprise an exclusive-OR (XOR) circuit 110, a first substitution stage 120, a second substitution stage 130, and a Cyclic Redundancy Check (CRC) stage 140. The load balancing system 100 can receive a load balancing vector. In some embodiments, for example, the load balancing vector may include fields such as, but not limited to, source and destination addresses, protocol information, session or connection information, packet size, server health information, server load information, Quality of Service (QOS) information, or other such metadata. In certain embodiments, in some examples, the load balancing system 100 can perform a static bit-permutation on the load balancing vector to generate a permuted load balancing vector. The permuted load balancing vector may be provided as an input to the XOR circuit 110. The load balancing system 100 can determine a unique seed value associated with the load balancing system 100 or a device that implements the load balancing system 100. In certain embodiments, the unique seed value can be determined based on one or more identifiers of the device. In more embodiments, for example, the unique seed value can be a device identifier, a switch identifier, or a node identifier.

In a number of embodiments, the XOR circuit 110 may encode the load balancing vector, or the permuted load balancing vector, based on the unique seed value to generate an encoded load balancing vector. In some embodiments, for example, the XOR circuit 110 can include an XOR gate that can receive the unique seed value as a first input and the load balancing vector as a second input, and generate the encoded load balancing vector as an output. The XOR circuit 110 may provide the encoded load balancing vector to the first substitution stage 120. In certain embodiments, in some examples, the load balancing system 100 can perform the static bit-permutation on the encoded balancing vector to generate the permuted load balancing vector. The permuted load balancing vector may be provided to the first substitution stage 120. The first substitution stage 120 can receive the encoded load balancing vector, or the permuted load balancing vector, and perform a substitution operation on the encoded load balancing vector, or the permuted load balancing vector. The first substitution stage 120 may generate one or more intermediate data blocks and provide the one or more intermediate data blocks to the second substitution stage 130. The second substitution stage 130 can receive the one or more intermediate data blocks and apply another substitution operation on the intermediate data blocks. The second substitution stage 130 may generate a modified load balancing vector and provide the modified load balancing vector to the CRC stage 140. The CRC stage 140 can receive the modified load balancing vector and apply a CRC hash on the modified load balancing vector to generate a load balancing key. The load balancing key may be indicative of a destination device or a destination link.

In various embodiments, the hash operation performed by the load balancing system 100 may be a CRC key-mixing operation. In some embodiments, the load balancing system 100 can operate with minimal latency. In certain embodiments, for example, the load balancing system 100 may perform the encoding stage by the XOR circuit 110, the first substitution stage 120, the second substitution stage 130, and the CRC stage 140 in one clock cycle, i.e., the load balancing system 100 requires only one clock cycle, for example.

Although a specific embodiment for the load balancing system 100 for carrying out the various steps, processes, methods, and operations described herein is discussed with respect to FIG. 1, any of a variety of systems and/or processes may be utilized in accordance with embodiments of the disclosure. For example, the load balancing system 100 may include one substitution stage or the load balancing system 100 may include more than two substitution stages. The elements depicted in FIG. 1 may also be interchangeable with other elements of FIGS. 2-11 as required to realize a particularly desired embodiment.

Figure 2:
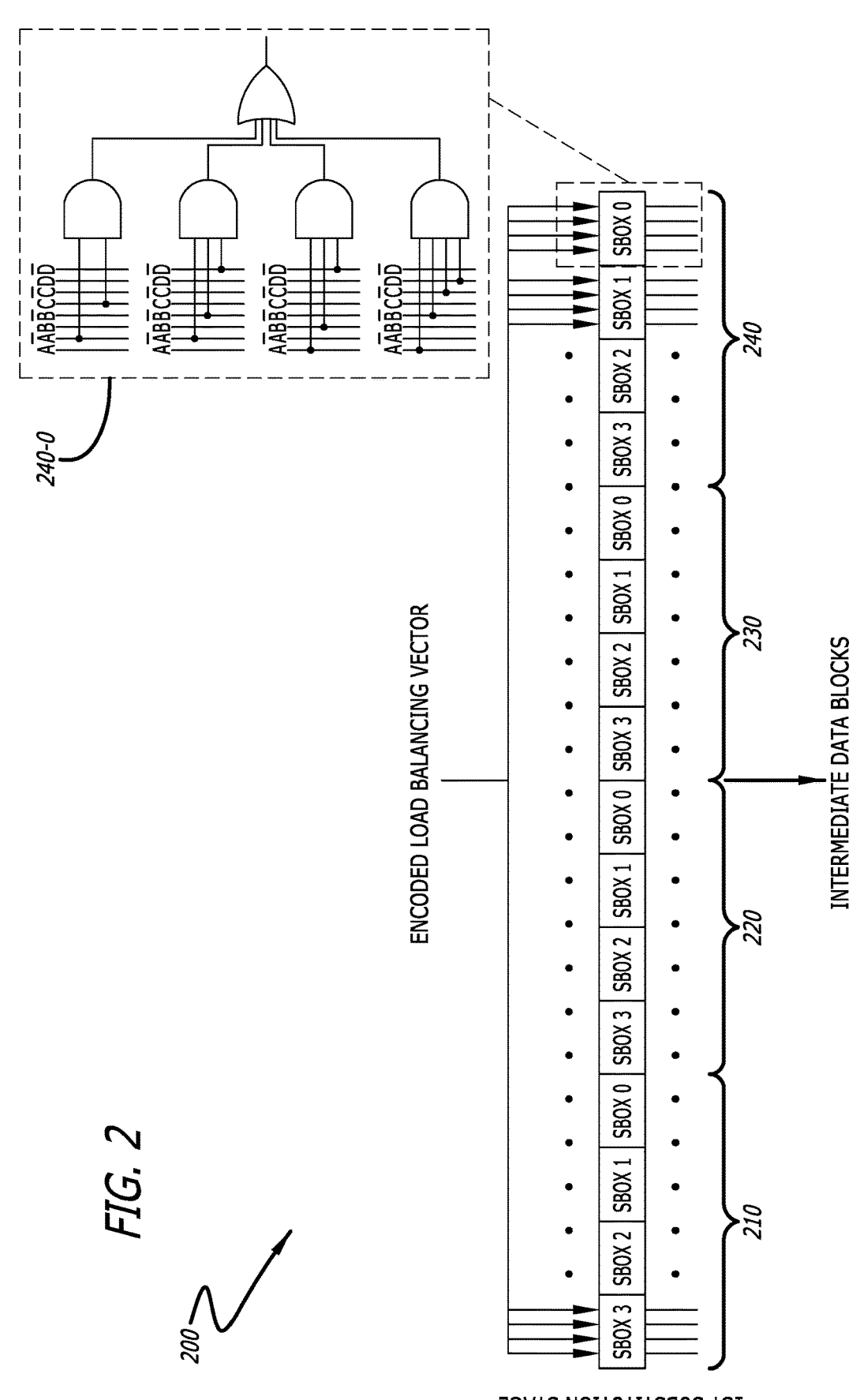
FIG. 2 is a conceptual illustration of one or more Substitution-Boxes (S-Boxes) in a first substitution stage, in accordance with various embodiments of the disclosure.

Referring to FIG. 2, a conceptual illustration of one or more Substitution-Boxes (S-Boxes) in a first substitution stage 200, in accordance with various embodiments of the disclosure is shown. In many embodiments, the first substitution stage 200 may include a first set of S-Boxes 210, 220, 230, 240. Each set of the first set of S-Boxes 210, 220, 230, 240 can further include one or more individual S-Boxes. In some embodiments, each of the first set of S-Boxes 210, 220, 230, 240 may include a predetermined number of S-Boxes. In an example shown in FIG. 2, each set of the first set of S-Boxes 210, 220, 230, 240 can include four S-Boxes, for example. However, it may be understood that a number of S-Boxes may vary for various devices and communication networks. In certain embodiments, for example, a number of S-Boxes in each stage may be equal or may differ for different stages. Each S-Box in the first substitution stage 200 can include one or more combinational circuits. In numerous embodiments, for example, one of the combinational circuits 240-0 in an S-Box is shown in an exploded view in FIG. 2. In more embodiments, for example, the first set of S-Boxes 210, 220, 230, 240 can be implemented by ASICs or Field Programmable Gate Arrays (FPGAs). In some more embodiments, for example, the first set of S-Boxes 210, 220, 230, 240 may be implemented by integrating into a System-on-Chip (SoC) of the device. Each S-Box may implement one or more substitution operations. In numerous embodiments, for example, each S-Box can implement a different substitution operation. Examples of the substitution operations include, but are not limited to, non-linear transformations, arithmetic operations, look-up tables, key-dependent substitutions, or custom S-Box designs.

In a number of embodiments, the first substitution stage 200 can divide the load balancing vector into one or more data blocks. In some embodiments, for example, the first substitution stage 200 may divide the load balancing vector into a group of a predetermined number of bits, for example, a group of four bits as shown in FIG. 2, that can form a data block. Each data block, or each group of bits, can be provided as the input to one of the S-Boxes in the first set of S-Boxes 210, 220, 230, 240. In certain embodiments, for example, each S-Box of the first set of S-Boxes 210, 220, 230, 240 may be an m×n S-Box or a n×n S-Box. In more embodiments, for example, each S-Box of the first set of S-Boxes 210, 220, 230, 240 can receive group of four bits of the load balancing vector and can generate an intermediate data block of four bits as shown in FIG. 2. That is, the first set of S-Boxes 210, 220, 230, 240 can receive the load balancing vector and generate a set of intermediate data blocks that can be provided as the input to the second substitution stage.

In various embodiments, for example, for a smaller sixty-four-bit input/output, the first substitution stage 200 may utilize a repeating pattern of four distinct S-Boxes [0-3] in each set of the first set of S-Boxes 210, 220, 230, 240, as shown in FIG. 2, with following substitutions from four-bit input to four-bit output, for example:

S-Box 0: 0x3, 0x8, 0xF, 0x1, 0xA, 0x6, 0x5, 0xB, 0xE, 0xD, 0x4, 0x2, 0x7, 0x0, 0x9, 0xC.

S-Box 1: 0xF, 0xC, 0x2, 0x7, 0x9, 0x0, 0x5, 0xA, 0x1, 0xB, 0xE, 0x8, 0x6, 0xD, 0x3, 0x4.

S-Box 2: 0x8, 0x6, 0x7, 0x9, 0x3, 0xC, 0xA, 0xF, 0xD, 0x1, 0xE, 0x4, 0x0, 0xB, 0x5, 0x2.

S-Box 3: 0x0, 0xF, 0xB, 0x8, 0xC, 0x9, 0x6, 0x3, 0xD, 0x1, 0x2, 0x4, 0xA, 0x7, 0x5, 0xE.

In additional embodiments, in the above example, different substitutions may be utilized in place of the above substitutions. In some embodiments, as shown in FIG. 2, each output bit of the S-Box is affected by each bit of the four-bit input to the combinational circuits 240-0. In certain embodiments, a coupling or wiring pattern used in the load balancing system may differ. In some more embodiments, for example, for a large load balancing vector, the load balancing vector can be divided into sub-vectors of smaller sizes, for e.g., in sizes of 64 bits for repeating one or more of the load balancing operations. In numerous embodiments, for example, for a load balancing vector which is 600 bits wide, the load balancing system may divide the load balancing vector into 10 sub-vectors of a maximum width of 64 bits. In this case, one or more unique seed values can be utilized for each sub-vector. In further embodiments, for example, for the load balancing vector of 600 bits, a unique seed value of 45 bits width may be replicated for encoding the load balancing vector.

Although a specific embodiment for the first substitution stage 200 for carrying out the various steps, processes, methods, and operations described herein is discussed with respect to FIG. 2, any of a variety of systems and/or processes may be utilized in accordance with embodiments of the disclosure. For example, the first substitution stage 200 may utilize identical S-Boxes or may utilize distinct S-Boxes. The elements depicted in FIG. 2 may also be interchangeable with other elements of FIG. 1 and FIGS. 3-11 as required to realize a particularly desired embodiment.

Figure 3:
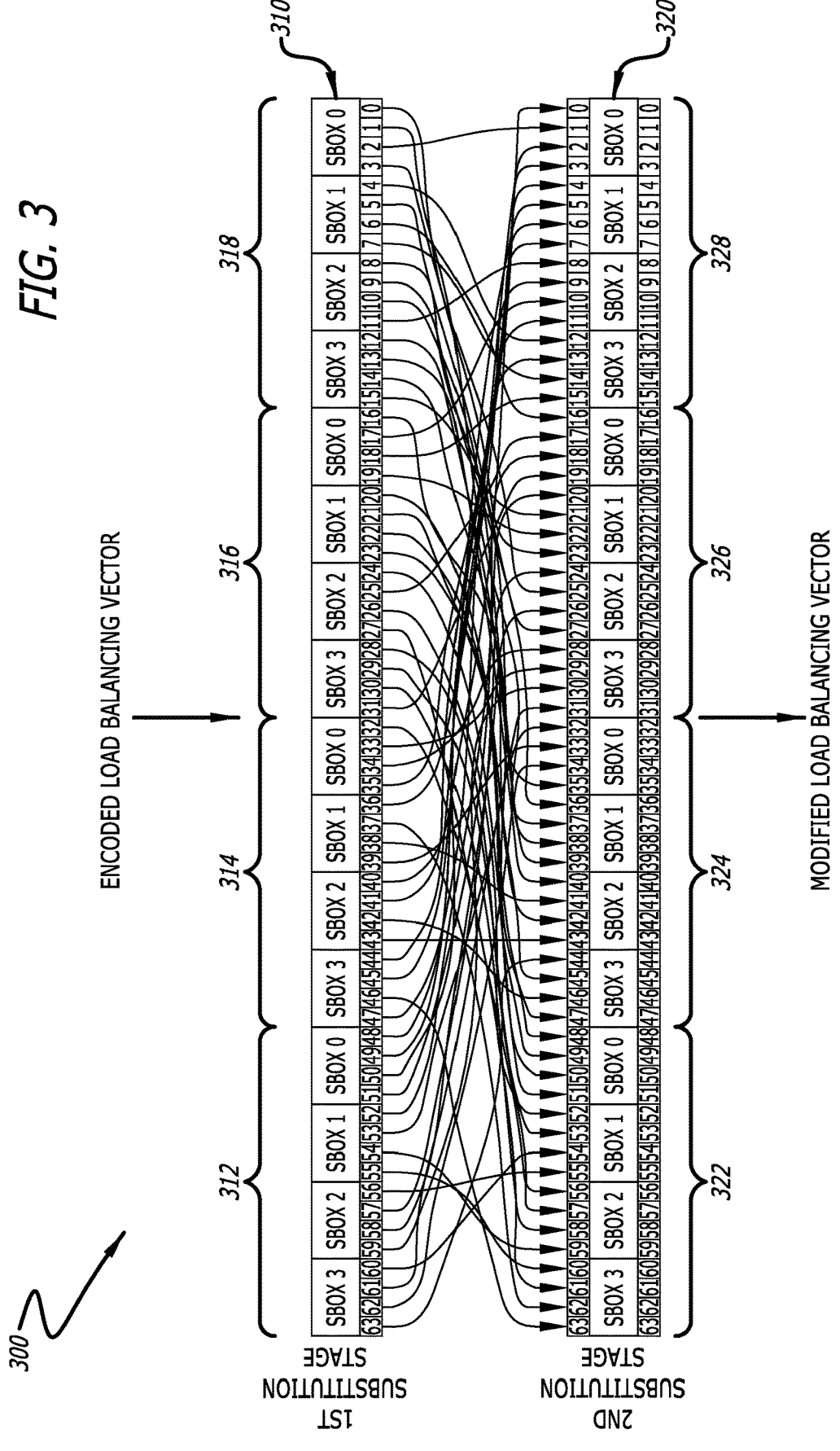
FIG. 3 is a conceptual illustration of a multi-stage substitution, in accordance with various embodiments of the disclosure.

Referring to FIG. 3, a conceptual illustration of a multi-stage substitution 300, in accordance with various embodiments of the disclosure is shown. In many embodiments, the multi-stage substitution 300 may include the first substitution stage 310 and the second substitution stage 320. The first substitution stage 310 can include the first set of S-Boxes 312, 314, 316, 318. In some embodiments, for example, the first substitution stage 310 may be identical to the first substitution stage 200 of FIG. 2. The second substitution stage 320 can include a second set of S-Boxes 322, 324, 326, 328. In certain embodiments, for example, the second substitution stage 320 can be identical to the first substitution stage 310.

In a number of embodiments, the second set of S-Boxes 322, 324, 326, 328 can receive the set of intermediate data blocks and can apply the substitution operation on the set of intermediate data blocks to generate a set of output data blocks. The set of output data blocks generated by the second set of S-Boxes 322, 324, 326, 328 may be utilized to generate a modified load balancing vector. In some more embodiments, for example, the first set of S-Boxes 312, 314, 316, 318 and the second set of S-Boxes 322, 324, 326, 328 may be structurally or functionally similar. In numerous embodiments, the first set of S-Boxes 312, 314, 316, 318 and the second set of S-Boxes 322, 324, 326, 328 may be entirely distinct in structure and function. In many further embodiments, different devices can utilize different substitution boxes. In still more embodiments, coupling between the S-Boxes of the first substitution stage 310 and the S-Boxes of the second substitution stage 320 may be different for different devices.

Although a specific embodiment for the multi-stage substitution 300 for carrying out the various steps, processes, methods, and operations described herein is discussed with respect to FIG. 3, any of a variety of systems and/or processes may be utilized in accordance with embodiments of the disclosure. For example, the multi-stage substitution 300 can utilize different types of substitution operations to generate the modified load balancing vector. The elements depicted in FIG. 3 may also be interchangeable with other elements of FIGS. 1-2 and FIGS. 4-11 as required to realize a particularly desired embodiment.

Figure 4:
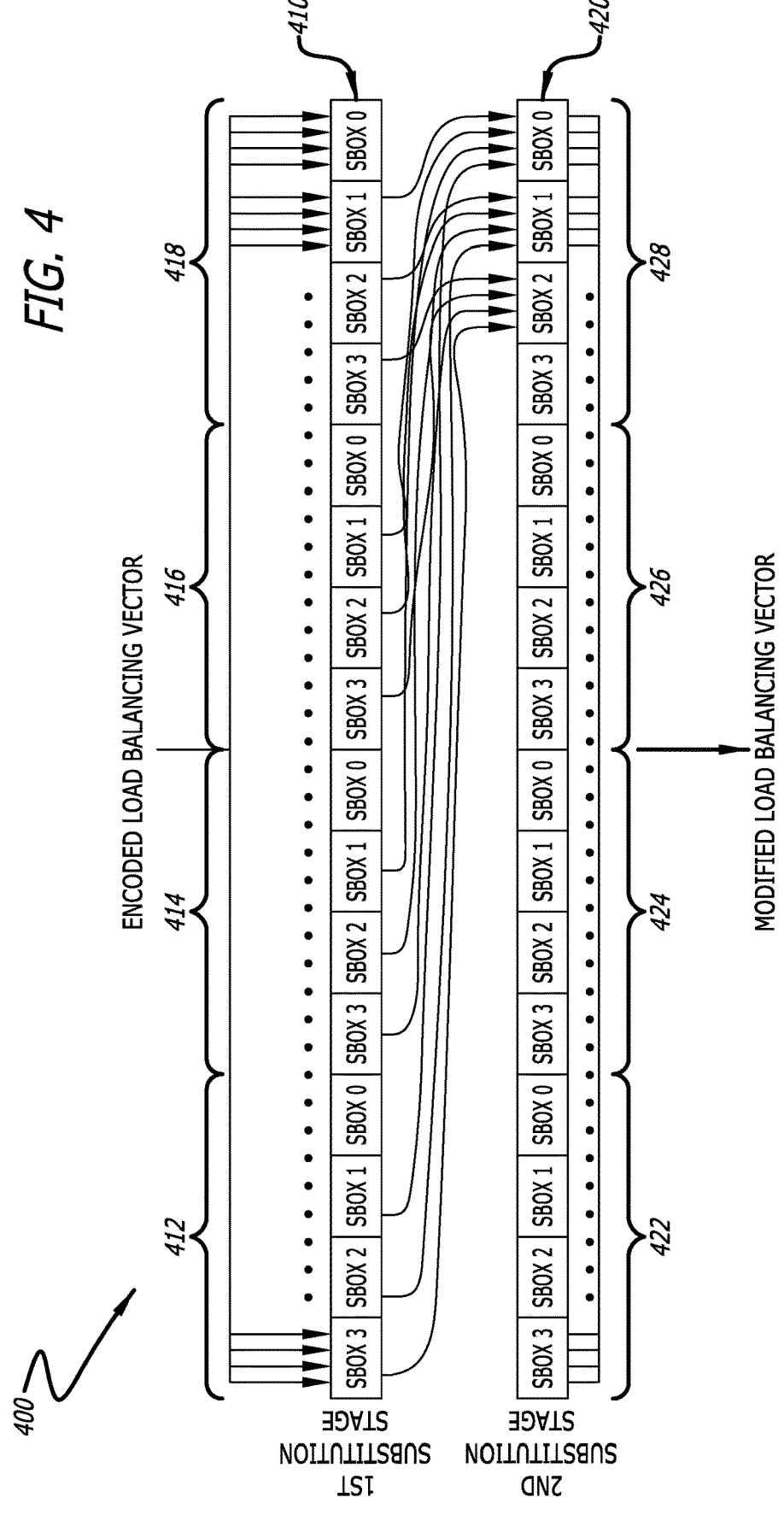
FIG. 4 is a conceptual illustration of a multi-stage substitution, in accordance with various embodiments of the disclosure.

Referring to FIG. 4, a conceptual illustration of a multi-stage substitution 400, in accordance with various embodiments of the disclosure is shown. The multi-stage substitution 400 may include a first substitution stage 410 and a second substitution stage 420. In many embodiments, for example, in the multi-stage substitution 400, it can be preferred to avoid having an output from S-Box [i] of the first substitution stage 410 as an input to same S-Box [i] of the second substitution stage 420. In certain embodiments, for example, this may be achieved by 'random-with-constraints' mapping or a completely random mapping, thereby causing a permutation similar to FIG. 3. In more embodiments, for example, as shown in FIG. 4, the mapping may be determined based on a width of the encoded load balancing vector and a stride length of the encoded load balancing vector. In some more embodiments, for example, a mapping for the encoded load balancing vector of width sixty-four bits and stride length twelve bits is shown in FIG. 4. In numerous embodiments, the width and/or the stride length of inputs to the first substitution stage 410 and the second substitution stage 420 can be different.

Although a specific embodiment for the multi-stage substitution 400 for carrying out the various steps, processes, methods, and operations described herein is discussed with respect to FIG. 4, any of a variety of systems and/or processes may be utilized in accordance with embodiments of the disclosure. For example, each substitution stage may operate on inputs of different widths and stride lengths, and further, wiring between the substitution stages may be determined based on the widths and stride lengths of the inputs to the substitution stages. The elements depicted in FIG. 4 may also be interchangeable with other elements of FIGS. 1-3 and FIGS. 5-11 as required to realize a particularly desired embodiment.

Figure 5:
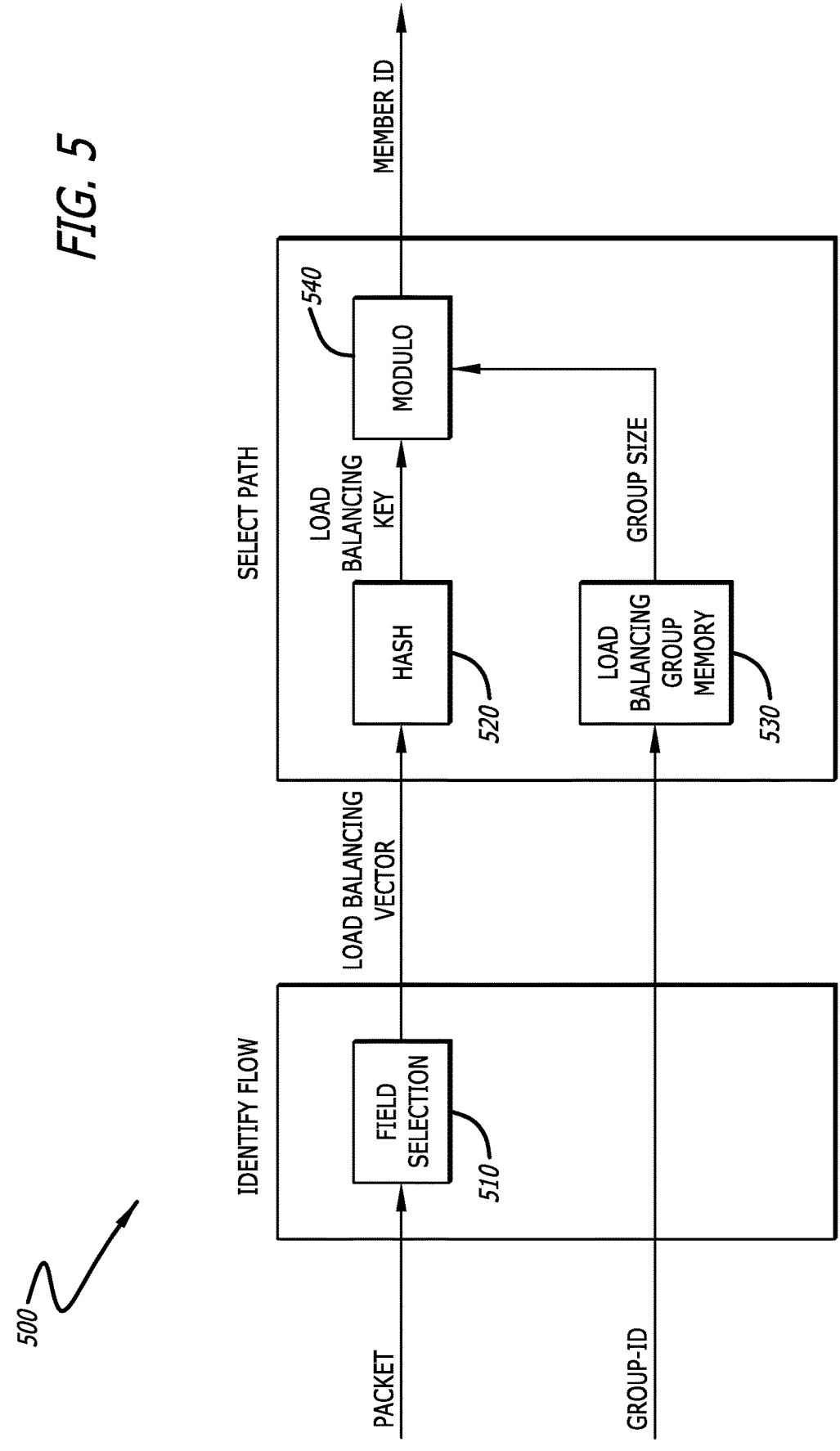
FIG. 5 is a conceptual illustration of a device, in accordance with various embodiments of the disclosure.

Referring to FIG. 5, a conceptual illustration of a device 500, in accordance with various embodiments of the disclosure is shown. The device 500 may include a flow identification stage and a path selection stage. The flow identification stage can include a field selection unit 510. The path selection stage can include a hash unit 520, a load balancing group memory 530, and a modulo unit 540.

In many embodiments, the field selection unit 510 may receive the stream of data packets. Each data packet in the stream of data packets can include the packet header. Each packet header may include one or more fields of metadata associated with the data packet or the stream of data packets. The field selection unit 510 can generate the load balancing vector based on the one or more fields in the packet header. In some embodiments, for example, each device in the communication network may utilize predetermined fields of the packet header. In certain embodiments, for example, each device in the communication network may randomly select the one or more fields of the packet header. The hash unit 520 can receive the load balancing vector and generate the load balancing key based on the load balancing vector. The load balancing group memory 530 may store a group identifier. The modulo unit 540 can perform a modulo operation on the load balancing key to determine a member identifier. The member identifier may be indicative of the destination device or the destination path. The device 500 can transmit, forward, or route the data packet to the destination device or the destination path indicated by the member identifier.

Although a specific embodiment for the device 500 for carrying out the various steps, processes, methods, and operations described herein is discussed with respect to FIG. 5, any of a variety of systems and/or processes may be utilized in accordance with embodiments of the disclosure. For example, the hash unit 520 in the device 500 may perform the load balancing method of the present disclosure. The elements depicted in FIG. 5 may also be interchangeable with other elements of FIGS. 1-4 and FIGS. 6-11 as required to realize a particularly desired embodiment.

Figure 6:
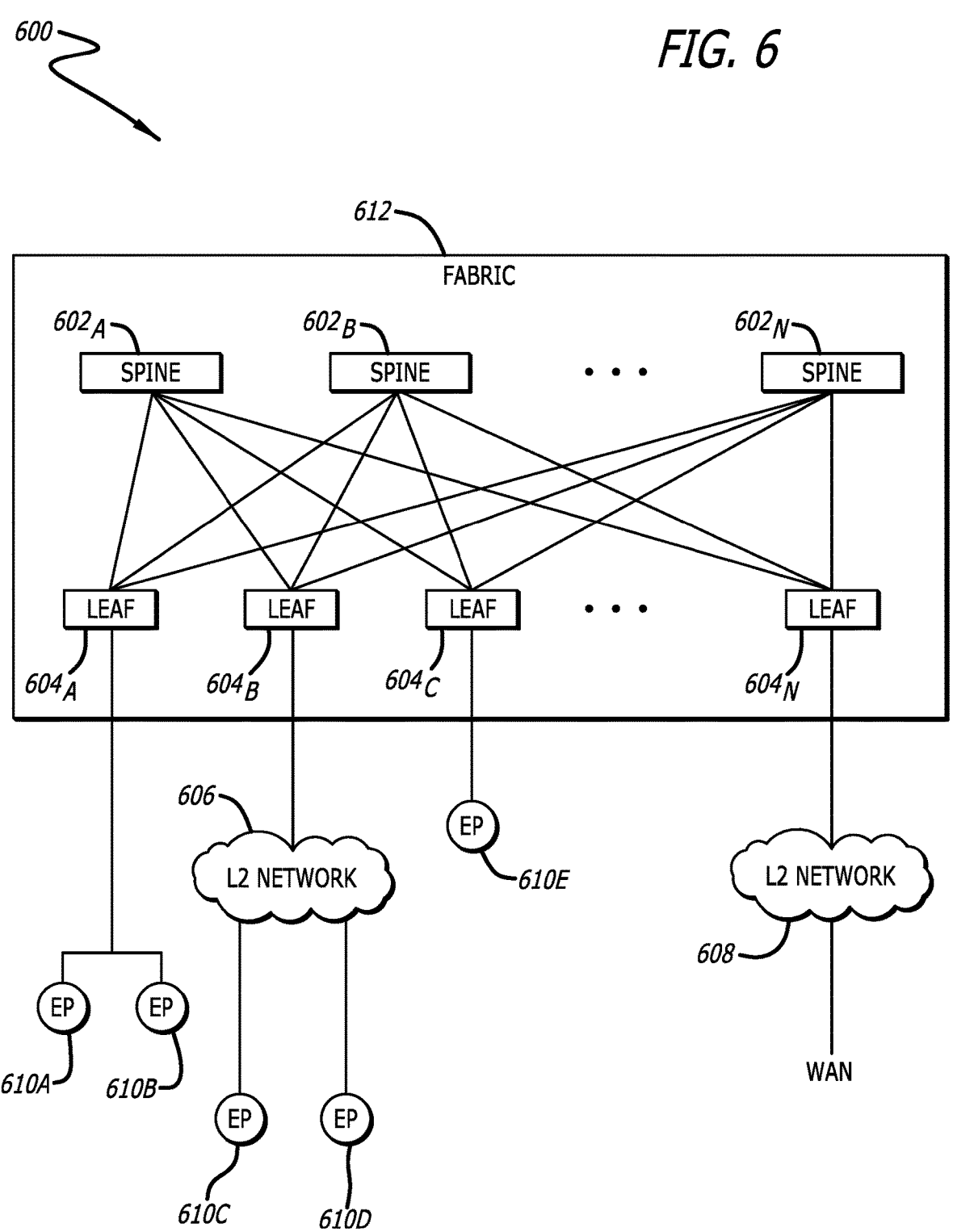
FIG. 6 is a schematic block diagram of an example architecture for a network fabric, in accordance with various embodiments of the disclosure.

Referring to FIG. 6, a schematic block diagram of an example architecture 600 for a network fabric 612, in accordance with various embodiments of the disclosure is shown. The network fabric 612 can include spine switches 602 A, 602B, . . . , 602 N (collectively "602") connected to leaf switches 604 A, 604 B, 604 C . . . 604 N (collectively "604") in the network fabric 612. As those skilled in the art will recognize, the network fabric 612 can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 602 can be L3 switches in the fabric 612. However, in some cases, the spine switches 602 can also, or otherwise, perform L2 functionalities. Further, the spine switches 602 can support various capabilities, such as, but not limited to, 40 or 10 Gbps Ethernet speeds. To this end, the spine switches 602 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 602 can be configured to host a proxy function that performs a lookup of the endpoint address identifier to locator mapping in a mapping database on behalf of leaf switches 604 that do not have such mapping. The proxy function can do this by parsing through the packet to the encapsulated tenant packet to get to the destination locator address. The spine switches 602 can then perform a lookup of their local mapping database to determine the correct locator address of the packet and forward the packet to the locator address without changing certain fields in the header of the packet.

In various embodiments, when a packet is received at a spine switch 602*i*, wherein subscript "i" indicates that this operation may occur at any spine switch 602A to 602N, the spine switch 602*i* can first check if the destination locator address is a proxy address. If so, the spine switch 602*i* can perform the proxy function as previously mentioned. If not, the spine switch 602*i* can look up the locator in its forwarding table and forward the packet accordingly.

In a number of embodiments, one or more spine switches 602 can connect to one or more leaf switches 604 within the network fabric 612. Leaf switches 604 can include access ports (or non-fabric ports) and fabric ports. Fabric ports can provide uplinks to the spine switches 602, while access ports can provide connectivity for devices, hosts, endpoints, VMs, or external networks to the fabric 612.

In more embodiments, leaf switches 604 can reside at the edge of the fabric 612, and can thus represent the physical network edge. In some cases, the leaf switches 604 can be top-of-rack ("ToR") switches configured according to a ToR architecture. In other cases, the leaf switches 604 can be aggregation switches in any particular topology, such as end-of-row (EoR) or middle-of-row (MoR) topologies. The leaf switches 604 can also represent aggregation switches, for example.

In additional embodiments, the leaf switches 604 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc.

In further embodiments, network connectivity in the network fabric 612 can flow through the leaf switches 604. Here, the leaf switches 604 can provide servers, resources, endpoints, external networks, or VMs access to the fabric 612, and can connect the leaf switches 604 to each other. In some cases, the leaf switches 604 can connect endpoint groups to the network fabric 612 and/or any external networks. Each endpoint group can connect to the network fabric 612 via one of the leaf switches 604, for example.

Endpoints 610 A-E (collectively "610", shown as "EP") can connect to the network fabric 612 via leaf switches 604. For example, endpoints 610A and 610B can connect directly to leaf switch 604A, which can connect endpoints 610A and 610B to the network fabric 612 and/or any other one of the leaf switches 604. Similarly, endpoint 610E can connect directly to leaf switch 604C, which can connect endpoint 610E to the network fabric 612 and/or any other of the leaf switches 604. On the other hand, endpoints 610C and 610D can connect to leaf switch 604B via L2 network 606. Similarly, the wide area network (WAN) can connect to the leaf switches 604C or 604D via L3 network 608. In certain embodiments, endpoints 610 can include any communication device, such as a computer, a server, a switch, a router, etc.

In many embodiments, for example, the spine switches 602 and/or the leaf switches 604 may perform the load balancing method of the present disclosure. The load balancing method of the present disclosure can be utilized to evenly or uniformly distribute the data traffic in the architecture 600 across all the spine switches 602 and the leaf switches 604. The data traffic may be the stream of data packets received from the endpoints 610.

Although a specific embodiment for an architecture 600 is described above with respect to FIG. 6, any of a variety of systems and/or processes may be utilized in accordance with embodiments of the disclosure. For example, the architecture 600 could comprise any variety of endpoints, spine switches, and/or leaf switches. The elements depicted in FIG. 6 may also be interchangeable with other elements of FIGS. 1-5 and 7-11 as required to realize a particularly desired embodiment. More details about an overlay network are described in more detail below.

Referring to FIG. 7, a flowchart depicting a process 700 for generating the load balancing key, in accordance with various embodiments of the disclosure is shown. In many embodiments, the process 700 can receive the load balancing vector (block 710). In some embodiments, the load balancing vector may include multiple fields that may be utilized to transmit, forward, or route the data traffic in the communication network. In certain embodiments, for example, the load balancing vector may include fields such as, but not limited to, source and destination addresses, protocol information, session or connection information, packet size, server health information, server load information, Quality of Service (QOS) information, or other such metadata.

In a number of embodiments, the process 700 may determine the unique seed value associated with the device (block 720). In some embodiments, the unique seed value may be different for different devices. In certain embodiments, the unique seed value can be determined based on one or more identifiers of the device. In more embodiments, for example, the unique seed value can be the device identifier, the switch identifier, or the node identifier.

In various embodiments, the process 700 can encode the load balancing vector based on the unique seed value to generate the encoded load balancing vector (block 730). In some embodiments, the process 700 may utilize the XOR operation to generate the encoded load balancing vector. In certain embodiments, the process 700 can utilize other encoding, encryption, or cipher techniques such as, but not limited to, Blowfish or Advanced Encryption Standard (AES), or other such cipher techniques to generate the encoded load balancing vector.

In additional embodiments, the process 700 may apply multi-stage substitution on the encoded load balancing vector (block 740). In some embodiments, the multi-stage substitution may include two substitution stages. In certain embodiments, the process 700 can utilize more than two substitution stages to achieve higher load balancing efficiencies. In more embodiments, for example, the process 700 may utilize a predetermined number of substitution stages. In some more embodiments, for example, the process 700 can determine a number of substitution stages required for achieving load balancing based on requirements of the communication network or requirements of one or more applications running on the device. In numerous embodiments, the process 700 may utilize a single substitution stage.

In further embodiments, the process 700 can generate the modified load balancing vector based on the multi-stage substitution (block 750). In some embodiments, the first substitution stage of the multi-stage substitution can apply the substitution operation on the encoded load balancing vector to generate the set of intermediate data blocks. In certain embodiments, the second substitution stage of the multi-stage substitution can apply the substitution operation on the intermediate data blocks to generate the modified load balancing vector.

In many more embodiments, the process 700 may apply the hash function on the modified load balancing vector (block 760). In some embodiments, for example, the hash function can be the CRC hash. In more embodiments, for example, the hash function can be RC5 hash or murmur hash, or any other hash function, for example.

In many additional embodiments, the process 700 can generate the load balancing key based on the hash function and the modified load balancing vector (block 770). In some embodiments, the load balancing key may be of lesser size than the load balancing vector. In certain embodiments, the load balancing key can be indicative of the destination device.

Although a specific embodiment for the process 700 for generating the load balancing key for carrying out the various steps, processes, methods, and operations described herein is discussed with respect to FIG. 7, any of a variety of systems and/or processes may be utilized in accordance with embodiments of the disclosure. For example, the process 700 may forward, transmit, or route the data traffic to the destination device indicated by the load balancing key. The elements depicted in FIG. 7 may also be interchangeable with other elements of FIGS. 1-6 and FIGS. 8-11 as required to realize a particularly desired embodiment.

Referring to FIG. 8, a flowchart depicting a process 800 performed by the first substitution stage, in accordance with various embodiments of the disclosure is shown. In many embodiments, the process 800 can receive the encoded load balancing vector (block 810). In certain embodiments, the encoded load balancing vector may be generated by applying the XOR function on the load balancing vector and the unique seed value. In more embodiments, the first substitution stage can be performed by the first set of S-Boxes.

In a number of embodiments, the process 800 may divide the encoded load balancing vector into the one or more data blocks (block 820). In some embodiments, the first substitution stage may divide the load balancing vector into the groups of the predetermined number of bits that can form the data block. In certain embodiments, each data block, or each group of bits, can be provided as the input to one of the S-Boxes in the first substitution stage.

In various embodiments, the process 800 can apply the substitution operation on the one or more data blocks (block 830). In some embodiments, each S-Box may implement the one or more substitution operations. In certain embodiments, for example, each S-Box can implement a different substitution operation. In more embodiments, examples of the substitution operations include, but are not limited to, non-linear transformations, arithmetic operations, look-up tables, key-dependent substitutions, or custom S-Box designs.

In additional embodiments, the process 800 may generate the one or more intermediate data blocks based on the substitution operation (block 840). In some embodiments, for example, each S-Box can receive group of four bits of the load balancing vector and generate an intermediate data block of four bits. In certain embodiments, the first set of S-Boxes can receive the load balancing vector as the input and generate the set of intermediate data blocks as the output that can be provided as the input to the second substitution stage.

In further embodiments, the process 800 can divide the intermediate data blocks into one or more bits (block 850). In some embodiments, for example, each S-Box may be an m×n S-Box or a n×n S-Box. In certain embodiments, each S-Box may comprise one or more combinational circuits configured to receive the one or more bits of the data block and generate the one or more bits of the intermediate data blocks.

In many more embodiments, the process 800 may transmit the one or more bits of the intermediate data block to the one or more S-Boxes of the second set of S-Boxes (block 860). In some embodiments, each S-Box of the first set of S-Boxes can be coupled with one or more S-Boxes of the second set of S-Boxes. In certain embodiments, for example, each output bit of an S-Box in the first substitution stage may be connected as the input to a distinct S-Box in the second substitution stage.

Although a specific embodiment for the process 800 performed by the first substitution stage for carrying out the various steps, processes, methods, and operations described herein is discussed with respect to FIG. 8, any of a variety of systems and/or processes may be utilized in accordance with embodiments of the disclosure. For example, the process 800 may be implemented by more than one substitution stages. The elements depicted in FIG. 8 may also be interchangeable with other elements of FIGS. 1-7 and FIGS. 9-11 as required to realize a particularly desired embodiment.

Referring to FIG. 9, a flowchart depicting a process 900 performed by the second substitution stage, in accordance with various embodiments of the disclosure is shown. In many embodiments, the process 900 can receive the one or more bits of the one or more intermediate data blocks (block 910). In some embodiments, the second substitution stage can be performed by the second set of S-Boxes. In certain embodiments, each S-Box of the second set of S-Boxes may receive the one or more input bits corresponding to the intermediate data blocks from multiple S-Boxes of the first set of S-Boxes. In more embodiments, the process 900 can have the predefined mapping between the first set of S-Boxes and the second set of S-Boxes.

In a number of embodiments, the process 900 may apply the substitution operation on the one or more bits (block 920). In some embodiments, the substitution operation of the second set of S-Boxes may be similar to the substitution operation of the first set of S-Boxes. In certain embodiments, the second set of S-Boxes may include one or more combinational circuits configured to apply the substitution operation on the set of intermediate data blocks.

In various embodiments, the process 900 can generate the one or more output data blocks (block 930). In some embodiments, each output bit of the output data blocks may be affected by each input bit of the intermediate data blocks. In certain embodiments, changing even one bit in the load balancing vector can substantially change the output data blocks, and consequently, the modified load balancing vector.

In additional embodiments, the process 900 may generate the modified load balancing vector based on the one or more output data blocks (block 940). In some embodiments, the process 900 can provide the modified load balancing vector to the CRC hash stage. In certain embodiments, the modified load balancing vector may be of same or lesser size than the load balancing vector.

Although a specific embodiment for the process 900 performed by the second substitution stage for carrying out the various steps, processes, methods, and operations described herein is discussed with respect to FIG. 9, any of a variety of systems and/or processes may be utilized in accordance with embodiments of the disclosure. For example, the process 900 may utilize different substitution operations for each S-Box. The elements depicted in FIG. 9 may also be interchangeable with other elements of FIGS. 1-8 and FIGS. 10-11 as required to realize a particularly desired embodiment.

Referring to FIG. 10, a flowchart depicting a process 1000 for load balancing, in accordance with various embodiments of the disclosure is shown. In many embodiments, the process 1000 may receive one or more data packets in the stream of data packets (block 1010). In some embodiments, the process 1000 can be performed by any device in the communication network. In certain embodiments, each data packet in the stream of data packets can include one packet header. In more embodiments, each packet header may include one or more fields of metadata associated with the data packet or the stream of data packets.

In a number of embodiments, the process 1000 may receive the load balancing vector (block 1020). In some embodiments, the process 1000 can generate the load balancing vector based on the one or more fields in the packet header. In certain embodiments, the process 1000 may utilize one or more predetermined fields of the packet header. In more embodiments, for example, the process 1000 may randomly select the one or more fields of the packet header.

In various embodiments, the process 1000 can generate the load balancing key based on the load balancing vector (block 1030). In some embodiments, the process 1000 may encode the load balancing vector to generate the encoded load balancing vector. In certain embodiments, the process 1000 can perform the substitution operation on the encoded load balancing vector to generate the modified load balancing vector. In more embodiments, the process 1000 may apply the hash function on the modified load balancing vector to generate the load balancing key.

In additional embodiments, the process 1000 may transmit the one or more data packets to the destination device based on the load balancing key (block 1040). In some embodiments, the process 1000 can apply the modulo operation on the load balancing key based on the group identifier or the group size to determine the member identifier. In certain embodiments, the process 1000 may transmit, forward, or route the data packets to the destination device indicated by the member identifier.

Although a specific embodiment for the process 1000 for load balancing for carrying out the various steps, processes, methods, and operations described herein is discussed with respect to FIG. 10, any of a variety of systems and/or processes may be utilized in accordance with embodiments of the disclosure. For example, the process 1000 may achieve even or uniform distribution of the data traffic across the devices in the communication network. The elements depicted in FIG. 10 may also be interchangeable with other elements of FIGS. 1-9 and FIG. 11 as required to realize a particularly desired embodiment.

Figure 11:
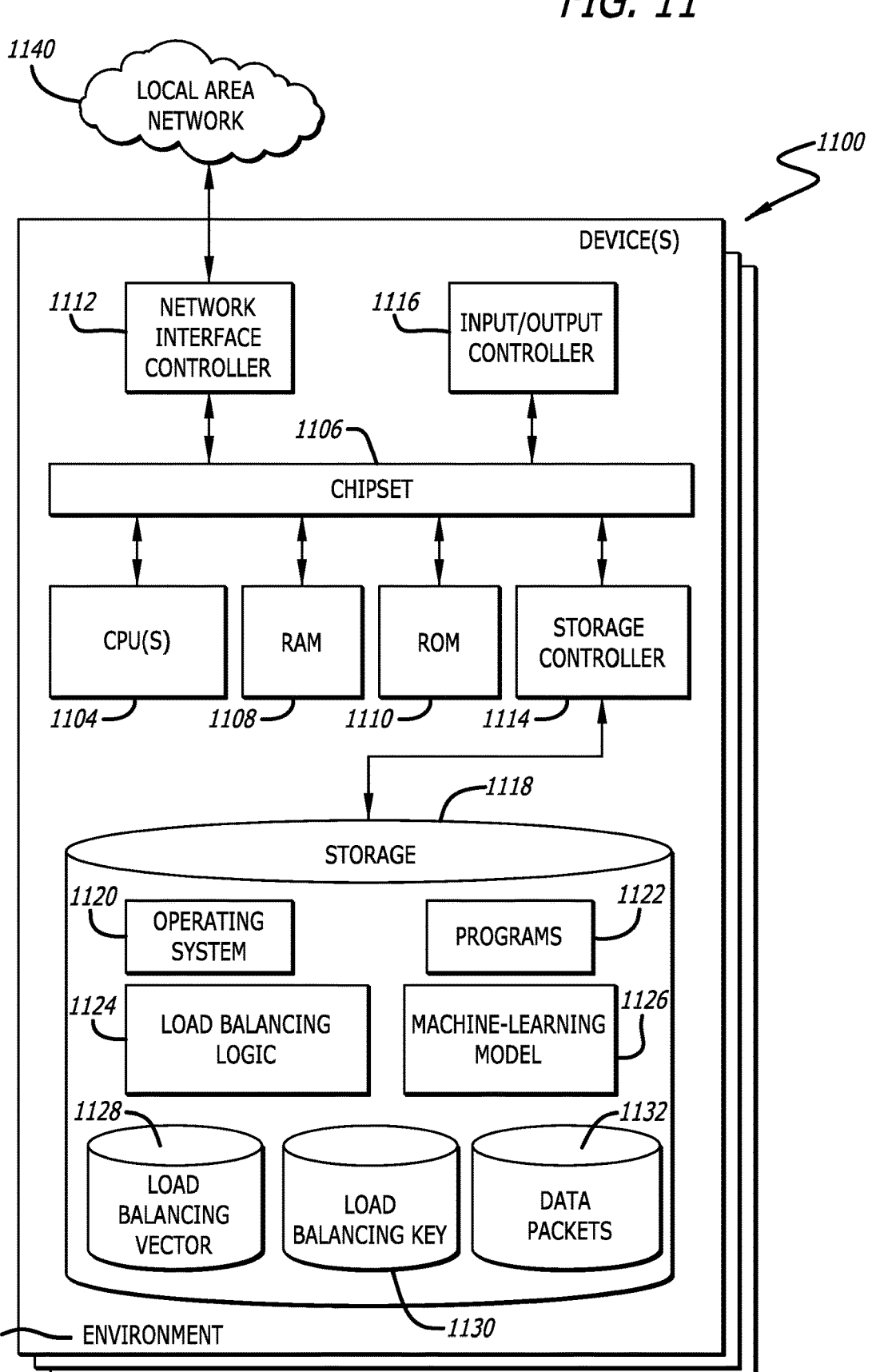
FIG. 11 is a conceptual block diagram of a device suitable for configuration with a load balancing logic, in accordance with various embodiments of the disclosure.

Referring to FIG. 11, a conceptual block diagram of a device 1100 suitable for configuration with a load balancing logic, in accordance with various embodiments of the disclosure is shown. The embodiment of the conceptual block diagram depicted in FIG. 11 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 11 can also illustrate an access point, a switch, or a router in accordance with various embodiments of the disclosure. The device 1100 may, in many non-limiting examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In a number of embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1106 may provide an interface between the processor(s) 1104 and the remainder of the components and devices within the environment 1102. The chipset 1106 can provide an interface to a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Additional embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for instance, store an operating system 1120, applications 1122, load balancing vector 1128, load balancing key 1130, and data packets 1132 which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The load balancing vector 1128 may be generated by the device 1100 based on the packet headers of the data packets 1132. The device 1100 may further generate the load balancing key 1130 based on the load balancing vector by utilizing a combination of the substitution operation and the hash operation. The device 1100 can receive the stream of data packets 1132 as the data traffic.

The device 1100 can store data within the storage 1118 by transforming the physical state of the physical storage units to reflect the information being stored. The specific transformation of physical state can depend on various factors.

Examples of such factors can include, but are not limited to, the technology used to implement the physical storage units, whether the storage 1118 is characterized as primary or secondary storage, and the like.

In many more embodiments, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In many additional embodiments, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-10. In certain embodiments, the device 1100 can also include computer-readable storage media having instructions stored thereupon for performing any of the other computer-implemented operations described herein.

In many further embodiments, the device 1100 may include a load balancing logic 1124. The load balancing logic 1124 can be configured to perform one or more of the various steps, processes, operations, and/or other methods that are described above. Often, the load balancing logic 1124 can be a set of instructions stored within a non-volatile memory that, when executed by the processor(s)/controller(s) 1104 can carry out these steps, etc. In some embodiments, the load balancing logic 1124 may be a client application that resides on a network-connected device, such as, but not limited to, a server, switch, personal or mobile computing device in a single or distributed arrangement. The load balancing logic 1124 can distribute the data traffic across multiple devices in the communication network.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11 or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

Finally, in numerous additional embodiments, data may be processed into a format usable by a machine-learning model 1126 (e.g., feature vectors), and or other pre-processing techniques. The machine-learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126.

The ML model(s) 1126 can be configured to generate inferences to make predictions or draw conclusions from data. An inference can be considered the output of a process of applying a model to new data. This can occur by learning from at least the load balancing vector 1128, the load balancing key 1130, and the data packets 1132 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1126 may be generated by human/administrator verifications or may compare predicted outcomes with actual outcomes.

Although a specific embodiment for the device 1100 suitable for configuration with the dynamic calibration logic for carrying out the various steps, processes, methods, and operations described herein is discussed with respect to FIG. 11, any of a variety of systems and/or processes may be utilized in accordance with embodiments of the disclosure. For example, the device 1100 may be in a virtual environment such as a cloud-based network administration suite, or it may be distributed across a variety of network devices or switches. The elements depicted in FIG. 11 may also be interchangeable with other elements of FIGS. 1-10 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor; and
a load balancing logic, configured to:
    receive a load balancing vector;
    determine a unique seed value associated with the device;
    encode the load balancing vector based on the unique seed value to generate an encoded load balancing vector;
    apply multi-stage substitution on the encoded load balancing vector; and
    generate a modified load balancing vector based on the multi-stage substitution.

2. The device of claim 1, wherein the encoded load balancing vector is generated by applying an exclusive-OR operation on the load balancing vector and the unique seed value.

3. The device of claim 1, wherein the unique seed value is determined based on one or more identifiers of the device.

4. The device of claim 1, wherein the load balancing logic is further configured to:
    apply a hash function on the modified load balancing vector; and
    generate a load balancing key based on the hash function and the modified load balancing vector.

5. The device of claim 4, wherein the hash function is a Cyclic Redundancy Check (CRC) hash.

6. The device of claim 4, wherein:
    a first substitution stage of the multi-stage substitution is performed by a first set of Substitution-Boxes (S-Boxes), and
    a second substitution stage of the multi-stage substitution is performed by a second set of S-Boxes.

7. The device of claim 6, wherein each S-Box of the first set of S-Boxes is coupled with one or more S-Boxes of the second set of S-Boxes.

8. The device of claim 7, wherein the first substitution stage is configured to:
    receive the load balancing vector;
    divide the load balancing vector into a one or more data blocks;
    apply a substitution operation on the one or more data blocks; and
    generate one or more intermediate data blocks based on the substitution operation.

9. The device of claim 8, wherein each S-Box of the first set of S-Boxes comprises a first combinational circuit configured to:
    receive a data block of the one or more data blocks;
    generate an intermediate data block of the one or more intermediate data blocks based on the data block;
    divide the intermediate data block into one or more bits; and
    transmit the one or more bits of the intermediate data block to the one or more S-Boxes of the second set of S-Boxes.

10. The device of claim 9, wherein each S-Box of the second set of S-Boxes comprises a second combinational circuit configured to:
    receive the one or more bits of the one or more intermediate data blocks;
    apply a substitution operation on the one or more bits of the one or more intermediate data blocks; and
    generate one or more output data blocks.

11. The device of claim 10, wherein the second substitution stage is configured to generate the modified load balancing vector based on the one or more output data blocks.

12. The device of claim 4, wherein the load balancing key is of lesser size than the load balancing vector.

13. The device of claim 12, wherein the load balancing key is indicative of a destination device.

14. The device of claim 13, wherein the load balancing logic is further configured to receive one or more data packets and transmit the one or more data packets to the destination device based on the load balancing key.

15. A device, comprising:
a processor;
a memory communicatively coupled to the processor; and
a load balancing logic, configured to:
    receive a load balancing vector;
    determine a unique seed value associated with the device;
    encode the load balancing vector based on the unique seed value to generate an encoded load balancing vector;
    apply multi-stage substitution on the encoded load balancing vector;
    generate a modified load balancing vector based on the multi-stage substitution;
    apply a hash function on the modified load balancing vector; and
    generate a load balancing key based on the hash function and the modified load balancing vector.

16. The device of claim 15, wherein a first substitution stage of the multi-stage substitution is configured to:
    receive the load balancing vector;
    divide the load balancing vector into a one or more data blocks;
    apply a substitution operation on the one or more data blocks; and
    generate one or more intermediate data blocks based on the substitution operation.

17. The device of claim 16, wherein a second substitution stage of the multi-stage substitution is configured to:
    receive the one or more intermediate data blocks;
    generate one or more output data blocks based on the one or more intermediate data blocks; and
    generate the modified load balancing vector based on the one or more output data blocks.

18. A method, comprising:
receiving a load balancing vector;
determining a unique seed value;
encoding the load balancing vector based on the unique seed value for generating an encoded load balancing vector;
applying multi-stage substitution on the encoded load balancing vector;
generating a modified load balancing vector based on the multi-stage substitution;
applying a hash function on the modified load balancing vector; and
generating a load balancing key based on the hash function and the modified load balancing vector.

19. The method of claim 18, comprising applying an exclusive-OR operation on the load balancing vector and the unique seed value for generating the encoded load balancing vector.

20. The method of claim 18, comprising configuring one or more sets of Substitution-Boxes (S-Boxes) for applying the multi-stage substitution on the encoded load balancing vector.

* * * * *